United States Patent
Anzai et al.

(10) Patent No.: US 7,175,827 B2
(45) Date of Patent: Feb. 13, 2007

(54) PROCESS OF PRODUCING FUEL GAS FOR FUEL CELL

(75) Inventors: Iwao Anzai, Yokohama (JP); Takaya Matsumoto, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 10/813,490

(22) Filed: Mar. 30, 2004

(65) Prior Publication Data

US 2004/0191165 A1  Sep. 30, 2004

Related U.S. Application Data

(62) Division of application No. 10/143,583, filed on May 10, 2002, now abandoned.

(30) Foreign Application Priority Data

May 11, 2001 (JP) ............................. 2001-141382

(51) Int. Cl.
*C01B 3/22* (2006.01)
*C01B 3/26* (2006.01)
*C01B 3/32* (2006.01)
*C01B 3/40* (2006.01)
*H01M 8/04* (2006.01)

(52) U.S. Cl. .................. 423/648.1; 423/651; 423/652; 429/17

(58) Field of Classification Search ............. 423/648.1, 423/650, 651, 652, 653, 654; 429/17
See application file for complete search history.

(56) References Cited

U.S. PATENT DOCUMENTS

| 3,679,773 | A |   | 7/1972  | Kovach et al. |
|-----------|---|---|---------|---------------|
| 3,700,745 | A |   | 10/1972 | Kovach et al. |
| 4,581,343 | A |   | 4/1986  | Blanchard et al. |
| 4,791,091 | A |   | 12/1988 | Bricker et al. |
| 4,868,148 | A |   | 9/1989  | Henk et al. |
| 4,923,842 | A |   | 5/1990  | Summers |
| 4,943,549 | A |   | 7/1990  | Immel et al. |
| 5,041,407 | A |   | 8/1991  | Williamson et al. |
| 5,268,346 | A |   | 12/1993 | Ino et al. |
| 6,218,326 | B1 |  | 4/2001  | Datta et al. |
| 6,267,874 | B1 |  | 7/2001  | Iijima et al. |
| 6,299,994 | B1 | * | 10/2001 | Towler et al. ................ 429/17 |
| 6,436,363 | B1 | * | 8/2002  | Hwang et al. ............. 423/651 |
| 6,468,484 | B1 |  | 10/2002 | Dou et al. |
| 6,492,297 | B1 |  | 12/2002 | Sung |
| 6,695,983 | B2 | * | 2/2004  | Prasad et al. ................ 252/373 |
| 2002/0009408 | A1 | * | 1/2002 | Wieland et al. ........... 423/418.2 |
| 2002/0098129 | A1 | * | 7/2002 | Martin et al. ................ 422/173 |
| 2002/0150532 | A1 | * | 10/2002 | Grieve et al. ............... 423/650 |
| 2004/0014600 | A1 | * | 1/2004 | Fukunaga .................... 502/304 |

OTHER PUBLICATIONS

U.S. Appl. No. 10/143,583, filed Nov. 2002, Anzai et al.
Catalytica Associates, Inc., "Overview of Fuel-Processing Technologies for Fuel-Cell Power Generation," Contract EC-77-C-03-1384, pp. 5-28 to 5-37, submitted to Department of Energy, Washington, D.C. (Nov. 6, 1978).
California Institute of Technology, "Autothermal Reforming of No. 2 Fuel Oil," EM-1126 Research Project 1041-2, pp. 5-1 to 6-17, prepared for Electric Power Research Institute, Palo Alto, California. (Jul. 1979).

* cited by examiner

*Primary Examiner*—Wayne A. Langel
(74) *Attorney, Agent, or Firm*—Akin Gump Strauss Hauer & Feld, LLP

(57) ABSTRACT

A process for producing a fuel gas for a fuel cell is provided. The process includes a step of converting hydrocarbons and/or oxygen-containing hydrocarbons to a reformed gas which is composed principally of hydrogen by an autothermal reforming reaction using an autothermal reforming catalyst. The catalyst includes rhodium supported on a support containing 5 to 40 percent by mass of a cerium oxide or rare earth element oxide which is composed principally of a cerium oxide, 60 to 95 percent by mass of an aluminum oxide, and 0 to 10 percent by mass in terms of metal of one or more elements selected from the group consisting of an alkaline metal and an alkaline earth metal, the atomic ratio of cerium and rhodium (Ce/Rh) being 1 to 250.

6 Claims, No Drawings

PROCESS OF PRODUCING FUEL GAS FOR FUEL CELL

CROSS-REFERENCE TO RELATED APPLICATIONS

This is a division of application Ser. No. 10/143,583, filed May 10, 2002, now abandoned, the disclosure of which is incorporated herein by reference.

BACKGROUND OF THE INVENTION

This invention relates to an autothermal reforming catalyst. This invention also relates to a process of producing a fuel gas for a fuel cell wherein hydrocarbons and/or oxygen-containing hydrocarbons are converted to a reformed gas which is composed principally of hydrogen by an autothermal reforming reaction using such a catalyst.

A known process for producing hydrogen from hydrocarbons or oxygen-containing hydrocarbons is an autothermal reforming method which is the combination of an oxidation reaction and a steam reforming reaction. In this process, hydrocarbons or oxygen-containing hydrocarbons, steam, and oxygen or air are introduced into a reactor, and a part of the hydrocarbons or oxygen-containing hydrocarbons is subjected to partial or complete combustion. While the reactor is then heated to a predetermined temperature with the heat generated by the combustion, the remaining hydrocarbons or oxygen-containing hydrocarbons are steam-reformed such that they are converted to a reformed gas which is composed principally of hydrogen. While a catalyst is charged into the reactor, it is required to have a combustion activity and a steam reforming activity.

Examples of such a catalyst are base metal-based catalysts such as nickel, copper, iron, and cobalt, and noble metal-based catalysts such as platinum, rhodium, ruthenium, iridium, and palladium.

The base metal-based catalysts are relatively prone to cause carbon precipitation. Since in order to suppress this, it is necessary to use materials of the catalyst, i.e., hydrocarbons or oxygen-containing hydrocarbons with an excess amount of steam, resulting in a condition where the steam/carbon ratio is high, the activity is inevitably reduced.

On the other hand, since the noble metal-based catalysts hardly cause the precipitation of carbon even under such a condition that the steam/carbon ratio is low, they have an advantage that an excess amount of steam is not required and a reformed gas which is composed principally of hydrogen can be produced at higher efficiency. However, in the case where oxygen coexists at elevated temperatures such as those at which an autothermal reforming reaction is conducted, there arises a problem that the catalyst activity is prone to be reduced due to the condensation or volatilization of the noble metals. Therefor, the noble metal-based catalysts have been demanded to be suppressed in the volatilization or condensation of the noble metals, but such catalysts with a sufficient industrial working life have not been developed yet.

In view of the foregoing, an object of the present invention is to provide a catalyst having a sufficient activity and working life in an autothermal reforming process with maintaining the effect of suppressing the carbon to precipitate at a low steam/carbon ratio.

BRIEF SUMMARY OF THE INVENTION

According to the present invention, there is provided an autothermal reforming catalyst comprising rhodium supported on a support comprising 5 to 40 percent by mass of a cerium oxide or rare earth element oxide which is composed principally of a cerium oxide, 60 to 95 percent by mass of an aluminum oxide, and 0 to 10 percent by mass in terms of metal of one or more elements selected from the group consisting of an alkaline metal and an alkaline earth metal, the atomic ratio of cerium to rhodium (Ce/Rh) being from 1 to 250.

According to the present invention, there is also provided the autothermal reforming catalyst characterized in that rhodium in an amount of 0.1 to 3 percent by mass in terms of metal based on the weight of the catalyst is supported.

Furthermore, according to the present invention, there is provided a process of producing a fuel gas for a fuel cell wherein hydrocarbons and/or oxygen-containing hydrocarbons are converted to a reformed gas which is composed principally of hydrogen by an autothermal reforming reaction using the catalyst.

DETAILED DESCRIPTION OF THE INVENTION

First of all, the support used in the present invention is described.

The support used in the present invention characteristically comprises 5 to 40 percent by mass of a cerium oxide or rare earth element oxide which is composed principally of a cerium oxide, 60 to 95 percent by mass of an aluminum oxide, and 0 to 10 percent by mass in terms of metal of one or more elements selected from the group consisting of an alkaline metal and an alkaline earth metal.

No particular limitation is imposed on the cerium oxide used in the present invention. However, ceric oxide generally referred to as ceria is preferred.

No particular limitation is imposed on the method of preparing the cerium oxide which, therefore, may be prepared using cerium nitrate ($Ce(NO_3)_3.6H_2O$, $Ce(NO_3)_4$), cerium chloride ($CeCl_3.nH_2O$), cerium hydroxide ($CeOH_3$, $CeOH_4.H_2O$), cerium carbonate ($Ce_2(CO_3)_3.8H_2O$, $Ce_2(CO_3)_3.5H_2O$), cerium oxalate, cerium oxalate (IV) ammonium, or cerium chloride as the starting material in a conventional manner such as calcination in the air.

The rare earth element oxide which is composed principally of a cerium oxide may be prepared from the salts of a mixed rare earth element which is composed principally of cerium.

The rare earth metal which is composed principally of a cerium oxide contains a cerium oxide in an amount of generally 50 percent by mass or more, preferably 60 percent by mass or more, and more preferably 70 percent by mass or more.

Examples of the rare earth element oxide are oxides of each element such as scandium, yttrium, lanthanum, protheodymium, neodymium, promethium, samarium, europium, gadolinium, terbium, dysprosium, holmium, erbium, thulium, ytterbium, and lutetium. Among these, preferred are oxides of yttrium, lanthanum, and neodymium, and more preferred are oxides of lanthanum. No particular limitation is imposed on the form of their crystallinity, and they may, therefore, have any type of crystallinity form.

The aluminum oxide used in the present invention includes, other than alumina, double oxides of aluminum and other element such as silicon, copper, iron, and titanium. Typical examples of such double oxides are silica alumina and the like.

Particularly preferred for the aluminum oxide is alumina. No particular limitation is imposed on alumina which may, therefore, have any type of crystallinity form such as α, β, γ, η, θ, κ, and χ. Particularly preferred is γ-type alumina. There may also be used alumina hydrates such as boehmite, bialite, and gibbsite.

No particular limitation is imposed on silica alumina which may, therefore, be in any type of crystallinity form. Needless to mention, an aluminum oxide even containing a small amount of impurities can be used without hindrance.

Examples of the alkaline metal are lithium, sodium, potassium, rubidium, caesium, and francium. Preferred are potassium and caesium, and particularly preferred is caesium.

Examples of the alkaline earth metal are magnesium, calcium, strontium, barium, and radium. Preferred are magnesium, barium, and calcium, and particularly preferred is barium.

These elements may be used alone or in combination.

Upon preparation of the support for the catalyst, these elements may be used in the form of oxide, hydroxide, carbonate, nitrate, chloride, sulfate, or acetate.

When these elements are used as the support for the catalyst, they are generally used in the crystallinity form of oxide or carbonate.

The catalyst support used in the present invention contains a cerium oxide or rare earth element oxide which is composed principally of a cerium oxide in an amount of 5 to 40 percent by mass, and preferably 10 to 35 percent by mass. The rare earth metal oxide in an amount of less than 5 percent by mass is insufficient in the effects of suppressing carbon to precipitate, facilitating the activity, and enhancing the heat-resistance under coexistence of oxygen, while that in amount of more than 40 percent by mass reduces the catalyst surface, leading to insufficient catalyst activity.

The catalyst support used in the present invention contains the aluminum oxide in an amount of 60 to 95 percent by mass, and preferably 65 to 90 percent by mass. The aluminum oxide of less than 60 percent by mass reduces the catalyst surface, leading to insufficient catalyst activity, while that in excess of 95 percent by mass is insufficient in the effects of suppressing carbon to precipitate, facilitating the activity, and enhancing the heat-resistance under coexistence of oxygen.

The catalyst support used in the present invention contains the alkaline metal and/or alkaline earth metal in an amount of 0 to 10 percent by mass in terms of metal. The upper limit is 10 percent by mass, but is preferably 7 percent by mass or less. The alkaline metal and/or alkaline earth metal in excess of 10 percent by mass would invite the possibility that the catalyst activity is reduced. No particular limitation is imposed on the lower limit. Therefore, this component may not be present at all, but may be present in an amount of generally 0.5 percent by mass or more, and preferably 0.8 percent by mass or more.

It is preferred that the cerium oxide or rare earth metal element oxide which is composed principally of a cerium oxide, the aluminum oxide and the alkaline metal and/or alkaline earth metal be well-dispersed in the support.

No particular limitation is imposed on the method of producing the support used in the present invention, which may, therefore, be produced by any known suitable method at ease. For example, the support may be produced by impregnating an aluminum oxide with an water-soluble solution of a salt of cerium or a rare earth metal which is composed principally of cerium, followed by drying and calcination. Eligible salts for this method are water-soluble salts. Preferred salts are nitrates, chlorides, sulfates, and acetates. Particularly preferred are nitrates or organic acid salts which are easily decomposed by calcination and become oxides.

The calcination is generally effected in the air or an oxygen atmosphere. No particular limitation is imposed on the temperature as long as it is the decomposition temperature of the salt or higher. However, the temperature is generally 500 to 1,400° C., and preferably 700 to 1,200° C.

Alternatively, the support may be prepared by coprecipitation, gel-kneading, and sol-gel methods.

In the case of preparing a support containing an alkaline metal and/or alkaline earth metal, no particular limitation is imposed on the method of adding the alkaline metal and/or alkaline earth metal into the support. For example, when a cerium oxide or rare earth element oxide which is composed principally of a cerium oxide is prepared, an aluminum oxide is prepared, or a support comprising a cerium oxide or rare earth element oxide which is composed principally of a cerium oxide and an aluminum oxide is prepared, a water-soluble solution of a nitrate, chloride or acetate of an alkaline metal and/or alkaline earth metal is impregnated into the precursor of the support, and then dried and calcined. Alternatively, after preparing a support comprising a cerium oxide or rare earth metal element oxide which is composed principally of a cerium oxide, and an aluminum oxide, a water-soluble solution of a nitrate, chloride or acetate of an alkaline metal and/or alkaline earth metal is impregnated into the support, and then dried and calcined.

Although the catalyst support can be obtained in such a manner, it is preferred that the catalyst support be calcined in the air or an oxygen atmosphere before rhodium being supported on the support. The calcination temperature is generally 500 to 1,400° C., and preferably 700 to 1,200° C.

In order to enhance the mechanical strength of the catalyst support, a small amount of binder, such as silica and cement may be added thereto.

No particular limitation is imposed on the shape of the support used in the present invention. Therefore, any shape may be suitably selected depending on the use of the catalyst. For example, the support may take any type of shape such as pellet-, granular-, honey-comb-, and sponge-like shape.

The catalyst of the present invention can be obtained by supporting rhodium on the above-described support. In the present invention, rhodium is used as an active metal. Rhodium is supported in such an amount that the atomic ratio of cerium to rhodium (Ce/Rh) is 1 to 250, preferably 2 to 100, and more preferably 3 to 50. The deviation of the atomic ratio from the range is not preferred because there is a possibility that sufficient catalyst activity may not be obtained.

The amount of rhodium to be supported is 0.1 to 3.0 percent by mass, and preferably 0.5 to 2.0 percent by mass in terms of metal based on the total mass of the catalyst (total mass of the support and the active metal).

No particular limitation is imposed on the method of supporting rhodium on the support. Any known method may be selected. For example, there may be employed impregnation, deposition, co-precipitation, kneading, ion-exchange, and pore-filling methods. Among these methods, particularly preferred is impregnation.

The starting materials of rhodium differ depending on the method of supporting rhodium and may be suitably selected.

However, generally, a chloride or nitrate of rhodium may be used. For example, in the case of employing impregnation, a solution (generally water-soluble solution) of a salt of rhodium is prepared and impregnated into the support. The support is dried and if necessary calcined.

The calcination is generally effected in the air or a nitrogen atmosphere. No particular limitation is imposed on the calcination temperature as long as it is the decomposition temperature of the salt or higher. It is generally 200 to 800° C., and preferably 300 to 600° C.

It is preferred in the present invention to prepare the catalyst by subjecting the support supporting rhodium to a reduction treatment under a reduction atmosphere, generally, a hydrogen atmosphere at a temperature of 400 to 1,000° C., and preferably 500 to 700° C.

In the present invention, the catalyst may further contain other noble metals such as ruthenium, platinum, iridium, and palladium supported on the support as well to an extent not to hinder the achievement of purpose of the invention.

The surface area of the catalyst of the present invention is generally 5 to 200 m$^2$/g, and preferably 10 to 150 m$^2$/g, while the pore volume is generally 0.05 to 1.0 cm$^3$/g, and preferably 0.1 to 0.7 cm$^3$/g.

No particular limitation is imposed on the shape of the catalyst. Therefore, it may be selected suitably depending on the use of the catalyst. For example, the catalyst may take any suitable shape such as pellet-, granular-, honey-comb-, and sponge-like shape.

Next, a process of producing a fuel gas for a fuel cell is described which process comprises a step of converting hydrocarbons and/or oxygen-containing hydrocarbons to a reformed gas which is composed principally of hydrogen by an autothermal reforming reaction using the catalyst of the present invention.

In the case of using a gas as the feed stock in the autothermal reforming reaction, the gas preheated to a predetermined temperature is well-mixed with steam and air or oxygen, and then introduced into a reactor filled with the catalyst. In the case of using a liquid as the feed stock, the liquid is evaporated, well-mixed with steam and air or oxygen, and then introduced into a reactor filled with the catalyst. In the case where sulfur is contained in the feed stock, it is preferred that the feed stock be desulfurized before introducing into a reactor.

The reaction temperature is generally 200 to 800° C., and preferably 300 to 600° C. at the inlet for the catalyst bed, and generally 500 to 1,000° C., and preferably 600 to 800° C. at the exit for the catalyst bed.

The reaction pressure is generally atmospheric pressure to 5 MPa, and preferably atmospheric pressure to 1 MPa.

The steam to be introduced together with the feed stock is introduced in such an amount that the steam/carbon ratio (molar ratio) is 0.1 to 5.0, and preferably 0.5 to 3.0.

The oxygen to be introduced together with the feed stock is introduced in such an amount that the $O_2$/carbon ratio (molar ratio) is 0.1 to 0.5, and preferably 0.2 to 0.4.

In the present invention, the feed stock for producing a reformed gas which is composed principally of hydrogen may be hydrocarbons, oxygen-containing hydrocarbons, and mixtures thereof. Specific examples are petroleum products such as methane, ethane, propane, butane, natural gas, LPG, manufactured gas, gasoline, naphtha, kerosene, and liquid fuels having a boiling point within the range of those thereof, alcohols such as methanol, ethanol, and propanol, and ethers such as dimethyl ether. The lesser the sulfur content, the better the hydrocarbons are. Particularly, it is preferred that the sulfur content be 1 wtppm or less.

In the process of the present invention, the feed stock hydrocarbons such as hydrocarbons and/or oxygen-containing hydrocarbons are converted to a reformed gas which is composed principally of hydrogen in the presence of the catalyst by an autothermal reforming reaction. A fuel gas for a fuel cell is generally supplied to a fuel cell stack by a process which is the combination of the desulfurization of the feed stock hydrocarbons prior to be subjected to an autothermal reforming treatment and the carbon monoxide conversion or carbon monoxide selective oxidation treatment of a reformed gas produced by an autothermal reforming. Alternatively, in place of the carbon monoxide conversion or carbon monoxide selective oxidation treatment after autothermal reforming, a fuel gas may be supplied to a fuel cell stack by a process which is the combination of the desulfurization with a hydro-refining process using a hydrogen-permeable membrane.

The autothermal reforming catalyst of the present invention has an extremely high activity and long working life. However, in the case of continuing the use of the catalyst over a long period of time, if necessary, the catalyst is preferably subjected to a refresh treatment such as reduction under a reduction atmosphere, generally, a hydrogen atmosphere at a temperature of 400 to 1,000° C., and preferably 500 to 700° C.

The autothermal reforming catalyst of the present invention is not decreased in activity even using rhodium which has conventionally the tendency to be decreased in activity under an oxygen atmosphere at elevated temperatures, leading to a sufficient working life and can maintain the effect of suppressing carbon to precipitate at a lower steam/carbon ratio.

EXAMPLES

The invention will be further described by way of the following examples which are provided for illustrative purposes only.

Example 1

(1) Preparation of Catalyst

γ-alumina powder with a specific surface of 190 m$^2$/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst A. The chemical composition of Catalyst A is shown in Table 1.

(2) Autothermal Reforming Reaction

A reaction tube with an inner diameter of 9 mm was filled with 1 cc of Catalyst A and then set in a tube-like electric oven. An autothermal reforming reaction was conducted by introducing desulfurized kerosene with the properties shown in Table 2 as the feed stock at an LHSV of 3.0 1$^{-1}$ into the reaction tube at a reaction temperature of 600° C., a steam/carbon ratio (molar ratio) of 3.0, and an oxygen/carbon ratio (molar ratio) of 0.33 and at atmospheric pressure for 20 hours.

The reaction gas was analyzed using gas chromatogram to measure the amount of $H_2$, $CO_2$, $CH_4$, and $O_2$, and the remainder was regarded as $N_2$. The conversion rate was determined by calculating the ratio of CO, $CO_2$, and $CH_4$ converted from the feed stock, i.e., kerosene, based on carbon. The results after 20 hours are shown in Table 1.

(3) Evaluation of Stability Under an Oxygen Atmosphere

Catalyst A was calcined in the air at a temperature of 600° C. for 5 hours thereby obtaining Catalyst A1. This calcination in the air corresponds to the accelerated oxidative deterioration conditions in an autothermal reforming reaction.

Thereafter, an autothermal reforming reaction was conducted using desulfurized kerosene as the feed stock and Catalyst A1 under the same conditions as those of the above (2) for 20 hours. The results after 20 hours are shown in Table 1.

Example 2

(1) Preparation of Catalyst

γ-alumina powder with a specific surface of 190 m²/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of barium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst B. The chemical composition of Catalyst B is shown in Table 1.

(2) Autothermal Reforming Reaction

An autothermal reforming reaction was conducted for 20 hours using desulfurized kerosene as the feed stock and Catalyst B under the same conditions as those of Example 1. The results after 20 hours are shown in Table 1.

(3) Evaluation of Stability Under an Oxygen Atmosphere

Catalyst B was calcined in the air at a temperature of 600° C. for 5 hours thereby obtaining Catalyst B1. An autothermal reforming reaction was conducted for 20 hours using desulfurized kerosene as the feed stock and Catalyst B1 under the same conditions as those of Example 1. The results after 20 hours are shown in Table 1.

Example 3

(1) Preparation of Catalyst

γ-alumina powder with a specific surface of 190 m²/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of magnesium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst C. The chemical composition of Catalyst C is shown in Table 1.

(2) Autothermal Reforming Reaction

An autothermal reforming reaction was conducted for 20 hours using desulfurized kerosene as the feed stock and Catalyst C under the same conditions as those of Example 1. The results after 20 hours are shown in Table 1.

(3) Evaluation of Stability Under an Oxygen Atmosphere

Catalyst C was calcined in the air at a temperature of 600° C. for 5 hours thereby obtaining Catalyst C1. An autothermal reforming reaction was conducted for 20 hours using desulfurized kerosene as the feed stock and Catalyst C1 under the same conditions as those of Example 1. The results after 20 hours are shown in Table 1.

Example 4

(1) Preparation of Catalyst

γ-alumina powder with a specific surface of 190 m²/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of magnesium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst D. The chemical composition of Catalyst D is shown in Table 1.

(2) Autothermal Reforming Reaction

An autothermal reforming reaction was conducted for 20 hours using desulfurized kerosene as the feed stock and Catalyst D under the same conditions as those of Example 1. The results after 20 hours are shown in Table 1.

(3) Evaluation of Stability Under an Oxygen Atmosphere

Catalyst D was calcined in the air at a temperature of 600° C. for 5 hours thereby obtaining Catalyst D1. An autothermal reforming reaction was conducted for 20 hours using desulfurized kerosene as the feed stock and Catalyst D1 under the same conditions as those of Example 1. The results after 20 hours are shown in Table 1.

Example 5

(1) Preparation of Catalyst

γ-alumina powder with a specific surface of 190 m²/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of potassium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst E. The chemical composition of Catalyst E is shown in Table 1.

(2) Autothermal Reforming Reaction

An autothermal reforming reaction was conducted for 20 hours using desulfurized kerosene as the feed stock and Catalyst E under the same conditions as those of Example 1. The results after 20 hours are shown in Table 1.

(3) Evaluation of Stability Under an Oxygen Atmosphere

Catalyst E was calcined in the air at a temperature of 600° C. for 5 hours thereby obtaining Catalyst E1. An autothermal reforming reaction was conducted for 20 hours using desulfurized kerosene as the feed stock and Catalyst E1 under the same conditions as those of Example 1. The results after 20 hours are shown in Table 1.

Example 6

(1) Preparation of Catalyst

γ-alumina powder with a specific surface of 190 m$^2$/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of caesium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst F. The chemical composition of Catalyst F is shown in Table 1.

(2) Autothermal Reforming Reaction

An autothermal reforming reaction was conducted for 20 hours using desulfurized kerosene as the feed stock and Catalyst F under the same conditions as those of Example 1. The results after 20 hours are shown in Table 1.

(3) Evaluation of Stability Under an Oxygen Atmosphere

Catalyst F was calcined in the air at a temperature of 600° C. for 5 hours thereby obtaining Catalyst F1. An autothermal reforming reaction was conducted for 20 hours using desulfurized kerosene as the feed stock and Catalyst F1 under the same conditions as those of Example 1. The results after 20 hours are shown in Table 1.

Example 7

(1) Preparation of Catalyst

γ-alumina powder with a specific surface of 190 m$^2$/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of caesium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst G. The chemical composition of Catalyst G is shown in Table 1.

(2) Autothermal Reforming Reaction

An autothermal reforming reaction was conducted for 20 hours using desulfurized kerosene as the feed stock and Catalyst G under the same conditions as those of Example 1. The results after 20 hours are shown in Table 1.

(3) Evaluation of Stability Under an Oxygen Atmosphere

Catalyst G was calcined in the air at a temperature of 600° C. for 5 hours thereby obtaining Catalyst G1. An autothermal reforming reaction was conducted for 20 hours using desulfurized kerosene as the feed stock and Catalyst G1 under the same conditions as those of Example 1. The results after 20 hours are shown in Table 1.

Example 8

(1) Preparation of Catalyst

Silica-alumina powder with a specific surface of 180 m$^2$/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of caesium nitrate, and the water was evaporated therefrom. The support was dried at a temperature of 120° C. for 3 hours and calcined in the air at a temperature of 800° C. for 3 hours.

The support was dipped into a water-soluble solution of rhodium chloride, and then the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst H. The chemical composition of Catalyst H is shown in Table 1.

(2) Autothermal Reforming Reaction

An autothermal reforming reaction was conducted for 20 hours using desulfurized kerosene as the feed stock and Catalyst H under the same conditions as those of Example 1. The results after 20 hours are shown in Table 1.

(3) Evaluation of Stability Under an Oxygen Atmosphere

Catalyst H was calcined in the air at a temperature of 600° C. for 5 hours thereby obtaining Catalyst H1. An autothermal reforming reaction was conducted for 20 hours using desulfurized kerosene as the feed stock and Catalyst H1 under the same conditions as those of Example 1. The results after 20 hours are shown in Table 1.

Example 9

(1) Autothermal Reforming Reaction

An autothermal reforming reaction was conducted for 20 hours using desulfurized light naphtha with the properties shown in Table 2 as the feed stock and Catalyst H in the same manner as that of Example 1. The reaction was conducted at a temperature of 600° C., a steam/carbon ratio (molar ratio) of 3.0, an oxygen/carbon ratio (molar ratio) of 0.33, atmospheric pressure, and an LHSV of 5 h$^{-1}$. The conversion rate and the composition of the reformed gas after 20 hours are also shown in Table 1.

(2) Evaluation of Stability Under an Oxygen Atmosphere

An autothermal reforming reaction was conducted for 20 hours using desulfurized light naphtha as the feed stock and Catalyst H1 under the same conditions as those of Example 1. The conversion rate and the composition of the reformed gas after 20 hours are also shown in Table 1.

Example 10

(1) Autothermal Reforming Reaction

An autothermal reforming reaction was conducted for 20 hours using propane with a purity of 99.5% or higher and the properties shown in Table 2 as the feed stock and Catalyst H in the same manner as that of Example 1. The reaction was conducted at a temperature of 600° C., a steam/carbon ratio (molar ratio) of 3.0, an oxygen/carbon ratio (molar ratio) of 0.33, atmospheric pressure, and an LHSV of 10 h$^{-1}$. The conversion rate and the composition of the reformed gas after 20 hours are also shown in Table 1.

(2) Evaluation of Stability Under an Oxygen Atmosphere

An autothermal reforming reaction was conducted for 20 hours using propane as the feed stock and Catalyst H1 under the same conditions as those of Example 1. The conversion rate and the composition of the reformed gas after 20 hours are also shown in Table 1.

COMPARATIVE EXAMPLE 1

(1) Preparation of Catalyst

γ-alumina powder with a specific surface of 190 m$^2$/g was calcined in the air at a temperature of 800° C. for 3 hours thereby obtaining a support. The support was then dipped into a water-soluble solution of rhodium chloride, and the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst I. The chemical composition of Catalyst I is shown in Table 1.

(2) Autothermal Reforming Reaction

An autothermal reforming reaction was conducted for 20 hours using desulfurized kerosene as the feed stock and Catalyst I under the same conditions as those of Example 1. The results after 20 hours are shown in Table 1.

(3) Evaluation of Stability Under an Oxygen Atmosphere

Catalyst I was calcined in the air at a temperature of 600° C. for 5 hours thereby obtaining Catalyst I1. An autothermal reforming reaction was conducted for 20 hours using desulfurized kerosene as the feed stock and Catalyst I1 under the same conditions as those of Example 1. The conversion rate and the composition of the reformed gas after 20 hours are also shown in Table 1.

COMPARATIVE EXAMPLE 2

(1) Preparation of Catalyst

γ-alumina powder with a specific surface of 190 m$^2$/g was dipped into a water-soluble solution of cerium nitrate, and the water is evaporated therefrom. The powder was dried at a temperature of 120° C. for 3 hours and then calcined in the air at a temperature of 800° C. for 3 hours, thereby preparing a catalyst support. The support was dipped into a water-soluble solution of barium nitrate, and the water was evaporated therefrom. The support was dried at a temperature of 120° C. for 3 hours and calcined at a temperature of 800° C. for 3 hours.

The support was dipped into a water-soluble solution of rhodium chloride, and the water was evaporated therefrom. The support was dried at a temperature of 120° C. for 3 hours. After the support was pressed, it was ground and sifted, thereby obtaining a granulated catalyst with a size of about 1 to 2 mm. The catalyst was reduced under a hydrogen circulation at a temperature of 500° C. for 3 hours thereby obtaining Catalyst J. The chemical composition of Catalyst J is shown in Table 1.

(2) Autothermal Reforming Reaction

An autothermal reforming reaction was conducted for 20 hours using desulfurized kerosene as the feed stock and Catalyst J under the same conditions as those of Example 1. The results after 20 hours are shown in Table 1.

(3) Evaluation of Stability Under an Oxygen Atmosphere

Catalyst J was calcined in the air at a temperature of 600° C. for 5 hours thereby obtaining Catalyst J1. An autothermal reforming reaction was conducted for 20 hours using desulfurized kerosene as the feed stock and Catalyst J1 under the same conditions as those of Example 1. The conversion rate and the composition of the reformed gas after 20 hours are shown in Table 1.

As apparent from Table 1, Catalysts A to H are extremely low in activity reduction even though they are calcined in the air assuming oxidation deterioration at elevated temperature in an autothermal reforming reaction, and is excellent in anti-oxidation properties.

TABLE 1

| | Inventive Examples | | | | | | | | | | | |
|---|---|---|---|---|---|---|---|---|---|---|---|---|
| | 1 | | 2 | | 3 | | 4 | | 5 | | 6 | |
| | Feed Stock | | | | | | | | | | | |
| | Desulfurized Kerosene | | Desulfurized Kerosene | | Desulfurized Kerosene | | Desulfurized Kerosene | | Desulfurized Kerosene | | Desulfurized Kerosene | |
| | Catalyst | | | | | | | | | | | |
| | A | A1 | B | B1 | C | C1 | D | D1 | E | E1 | F | F1 |
| Catalyst Composition (mass %) | | | | | | | | | | | | |
| SiO$_2$.Al$_2$O$_3$ | — | — | — | — | — | — | — | — | — | — | — | — |
| Al$_2$O$_3$ | balance | balance | balance | balance | balance | balance | balance | balance | balance | balance | balance | balance |
| CeO$_2$ | 20 | 20 | 15 | 15 | 15 | 15 | 10 | 10 | 10 | 10 | 10 | 10 |
| Ba | — | — | 5 | 5 | — | — | — | — | — | — | — | — |
| Mg | — | — | — | — | 5 | 5 | 5 | 5 | — | — | — | — |
| K | — | — | — | — | — | — | — | — | 5 | 5 | — | — |
| Cs | — | — | — | — | — | — | — | — | — | — | 5 | 5 |
| Rh | 1 | 1 | 2 | 2 | 2 | 2 | 2 | 2 | 2 | 2 | 2 | 2 |
| Conversion Rate (%) | 100 | 100 | 100 | 100 | 100 | 100 | 100 | 100 | 100 | 100 | 100 | 100 |

TABLE 1-continued

| | | | | | | | | | | | | |
|---|---|---|---|---|---|---|---|---|---|---|---|---|
| Carbon Precipitation Amount (mass %) | <0.1 | <0.1 | <0.1 | <0.1 | <0.1 | <0.1 | <0.1 | <0.1 | <0.1 | <0.1 | <0.1 | <0.1 |
| Composition of Reformed Gas (volume %, dry basis) | | | | | | | | | | | | |
| $H_2$ | 47.5 | 47.1 | 47.7 | 47.0 | 47.9 | 47.3 | 48.0 | 47.5 | 48.0 | 47.3 | 48.1 | 47.1 |
| CO | 7.9 | 7.2 | 7.9 | 7.8 | 7.9 | 7.3 | 7.7 | 7.5 | 7.8 | 7.1 | 7.8 | 7.2 |
| $CO_2$ | 15.4 | 15.5 | 14.9 | 15.0 | 15.0 | 15.3 | 15.3 | 15.4 | 15.0 | 15.6 | 15.3 | 15.5 |
| $CH_4$ | 0.1 | 0.2 | 0.1 | 0.1 | 0.1 | 0.2 | 0.1 | 0.2 | 0.1 | 0.2 | 0.1 | 0.2 |
| $O_2$ | 0.2 | 0.2 | 0.2 | 0.2 | 0.2 | 0.2 | 0.2 | 0.2 | 0.2 | 0.2 | 0.2 | 0.2 |
| $N_2$ | 28.9 | 29.8 | 29.2 | 29.9 | 28.9 | 29.7 | 28.7 | 29.2 | 28.9 | 29.6 | 28.5 | 29.8 |

| | Inventive Examples | | | | | | | | Comparative Examples | | | |
|---|---|---|---|---|---|---|---|---|---|---|---|---|
| | 7 | | 8 | | 9 | | 10 | | 1 | | 2 | |
| Feed Stock | Desulfurized Kerosene | | Desulfurized Kerosene | | Desulfurized Light Naptha | | Propane | | Desulfurized Kerosene | | Desulfurized Kerosene | |
| Catalyst | G | G1 | H | H1 | H | H1 | H | H1 | I | I1 | J | J1 |
| Catalyst Composition (mass %) | | | | | | | | | | | | |
| $SiO_2 \cdot Al_2O_3$ | — | — | balance | balance | balance | balance | balance | balance | — | — | — | — |
| $Al_2O_3$ | balance | balance | — | — | — | — | — | — | 99 | 99 | balance | balance |
| $CeO_2$ | 10 | 10 | 10 | 10 | 10 | 10 | 10 | 10 | — | — | 1 | 1 |
| Ba | — | — | — | — | — | — | — | — | — | — | 15 | 15 |
| Mg | — | — | — | — | — | — | — | — | — | — | — | — |
| K | — | — | — | — | — | — | — | — | — | — | — | — |
| Cs | 5 | 5 | 5 | 5 | 5 | 5 | 5 | 5 | — | — | — | — |
| Rh | 1 | 1 | 1 | 1 | 1 | 1 | 1 | 1 | 1 | 1 | 1 | 1 |
| Conversion Rate (%) | 100 | 100 | 100 | 100 | 100 | 100 | 100 | 100 | 89 | 65 | 91 | 73 |
| Carbon Precipitation Amount (mass %) | <0.1 | <0.1 | <0.1 | <0.1 | <0.1 | <0.1 | <0.1 | <0.1 | 1 | 3 | 0.8 | 2 |
| Composition of Reformed Gas (volume %, dry basis) | | | | | | | | | | | | |
| $H_2$ | 47.9 | 47.0 | 47.6 | 47.3 | 47.1 | 47.0 | 47.3 | 47.2 | 46.1 | 43.9 | 46.0 | 45.5 |
| CO | 7.1 | 7.0 | 7.1 | 7.0 | 6.8 | 6.7 | 7.0 | 6.9 | 6.4 | 5.3 | 6.3 | 6.0 |
| $CO_2$ | 15.3 | 15.6 | 15.1 | 15.3 | 14.0 | 14.1 | 13.5 | 13.7 | 16.1 | 16.5 | 16.0 | 16.0 |
| $CH_4$ | 0.2 | 0.2 | 0.2 | 0.2 | 0.2 | 0.2 | 0.2 | 0.2 | 0.3 | 0.5 | 0.3 | 0.4 |
| $O_2$ | 0.2 | 0.2 | 0.2 | 0.2 | 0.2 | 0.2 | 0.2 | 0.2 | 0.2 | 0.3 | 0.3 | 0.3 |
| $N_2$ | 29.3 | 30.0 | 29.8 | 30.0 | 31.7 | 31.8 | 31.8 | 31.8 | 30.9 | 33.5 | 31.1 | 31.8 |

TABLE 2

| Feed Stock | | Desulfurized Kerosene | Desulfurized Light Naptha | Propane |
|---|---|---|---|---|
| Density | g/cm³ (15° C.) | 169 0.7943 | 0.6407 | 0.5080 |
| Distillation Properties | | | | |
| Initial Point | ° C. | 154.0 | 25.5 | |
| Running Point at 10 vol % | ° C. | 173.0 | 32.5 | |
| Running Point at 50 vol % | ° C. | 199.0 | 41.5 | |
| Running Point at 90 vol % | ° C. | 239.0 | 60.0 | |
| Running Point at 95 vol % | ° C. | 248.5 | 66.0 | |
| End Point | ° C. | 262.5 | 71.5 | |
| Sulfur Contents | mass ppm | <1 | <1 | <1 |
| Composition | | | | |
| Paraffins | volume ppm | 84.6 | 99.9 | |
| Olefins | volume ppm | 0.0 | 0.0 | |
| Aromatics | volume ppm | 15.4 | 0.1 | |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing a fuel gas for a fuel cell which comprises a step of converting hydrocarbons and/or oxygen-containing hydrocarbons to a reformed gas which is composed principally of hydrogen by an autothermal reforming reaction using an autothermal reforming catalyst which comprises rhodium supported on a support containing a cerium oxide or rare earth element oxide which is composed principally of a cerium oxide, 60 to 95 percent by mass of an aluminum oxide, and one or more elements selected from the group consisting of an alkaline metal and alkaline earth metal, the total amount of said cerium oxide or rare earth element oxide and one or more elements being from 15 percent by mass to 20 percent by mass, the atomic ratio of cerium and rhodium (Ce/Rh) being 1 to 250.

2. The process for producing a fuel gas for a fuel cell according to claim 1 wherein said autothermal reaction is conducted at a catalyst bed inlet temperature of 200 to 800° C. and at a catalyst bed exit temperature of 500 to 1,000° C.

3. The process for producing a fuel gas for a fuel cell according to claim 1 wherein said autothermal reaction is conducted at a pressure of atmospheric pressure to 5 MPa.

4. The process for producing a fuel gas for a fuel cell according to claim 1 wherein the feed stock to be converted to said reformed gas is a petroleum product selected from the group consisting of methane, ethane, propane, butane, natural gas, LPG, manufactured gas, gasoline, naphtha, kerosene, and liquid fuels having boiling points within a boiling point range of the foregoing petroleum products.

5. The process for producing a fuel gas for a fuel cell according to claim 1 wherein the feed stock to be converted to said reformed gas is an alcohol selected from the group consisting of methanol, ethanol, propanol, and dimethyl ether.

6. The process for producing a fuel gas for a fuel cell according to claim 1 wherein said support is calcined at a temperature of 700 to 1200° C.

* * * * *